July 23, 1968  A. STYKA  3,393,918
FILAMENT WOUND RESIN REINFORCED STRUCTURE AND METHOD
Filed Aug. 24, 1966  3 Sheets-Sheet 1
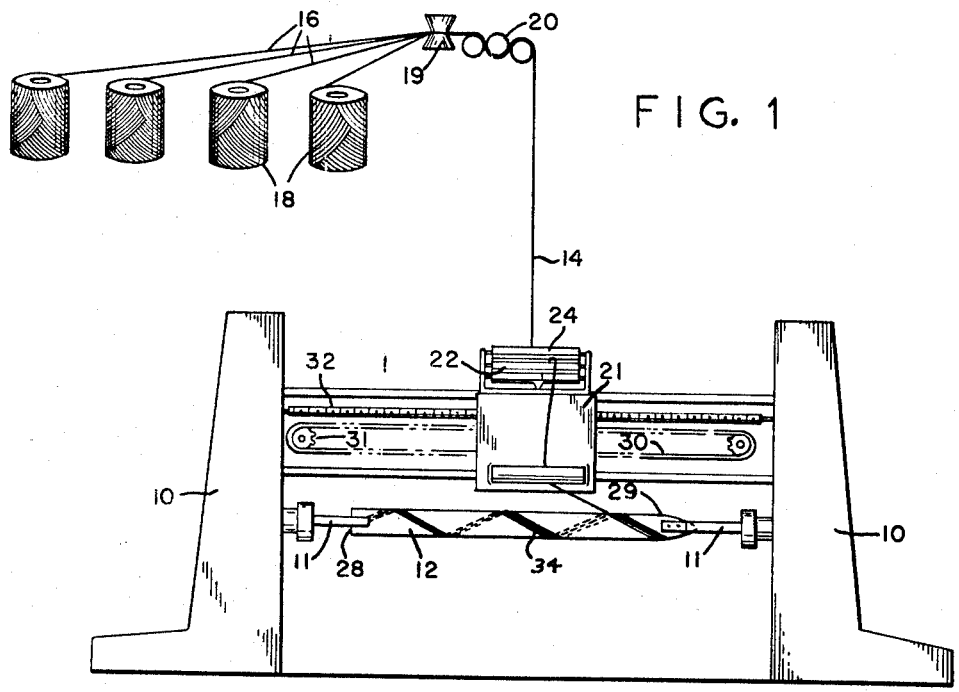
FIG. 1
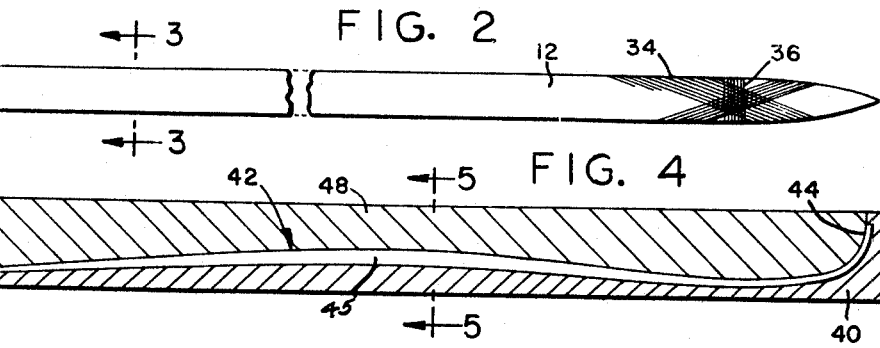
FIG. 2
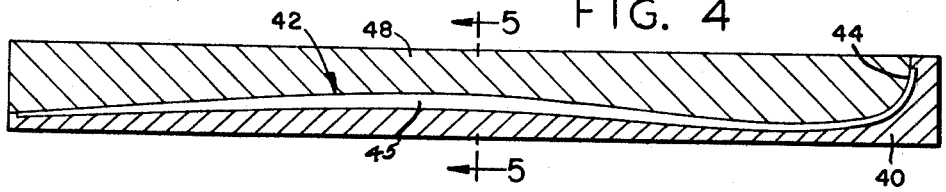
FIG. 4
FIG. 3
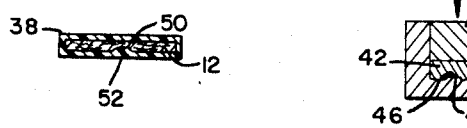
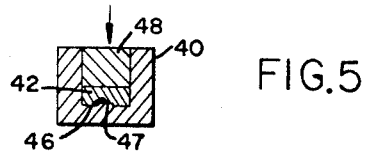
FIG. 5
INVENTOR
ANDREW STYKA
BY JOHN P. CHANDLER
ATTORNEY July 23, 1968            A. STYKA            3,393,918
FILAMENT WOUND RESIN REINFORCED STRUCTURE AND METHOD
Filed Aug. 24, 1966            3 Sheets-Sheet 2
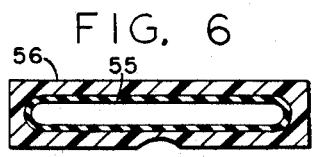
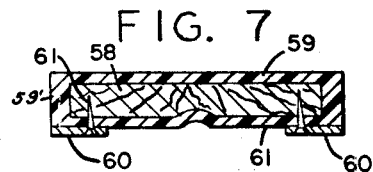
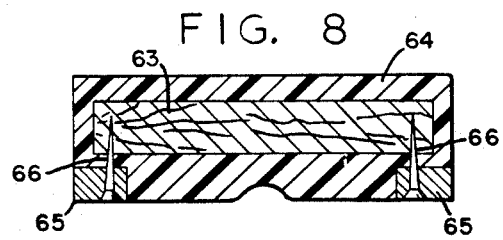
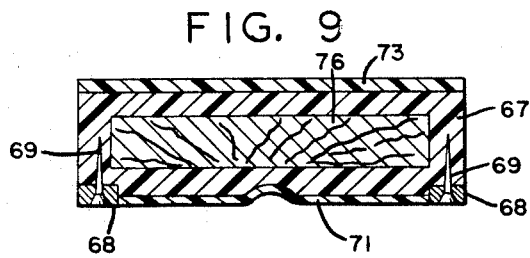
INVENTOR
ANDREW STYKA
BY    JOHN P. CHANDLER
ATTORNEY July 23, 1968 A. STYKA 3,393,918
FILAMENT WOUND RESIN REINFORCED STRUCTURE AND METHOD
Filed Aug. 24, 1966 3 Sheets-Sheet 3

INVENTOR.
ANDREW STYKA
BY
JOHN P. CHANDLER
HIS ATTORNEY.

3,393,918
FILAMENT WOUND RESIN REINFORCED
STRUCTURE AND METHOD
Andrew Styka, 33 Hunter Place,
Smithtown, N.Y. 11787
Continuation-in-part of applications Ser. No. 445,469,
Apr. 5, 1965, and Ser. No. 511,557, Aug. 6, 1965. This
application Aug. 24, 1966, Ser. No. 591,937
29 Claims. (Cl. 280—11.13)

ABSTRACT OF THE DISCLOSURE

A filament wound ski having a wooden core and helical and girth windings of continuous glass fiber filaments compacted by a resin binder.

---

The present application is a continuation-in-part of my co-pending United States applications Ser. No. 445,469, filed Apr. 5, 1965 and Ser. No. 511,557, filed Aug. 6, 1965, both of which are now abandoned.

This invention relates to a method of making articles from plastic materials which are reinforced by continuous strands or filaments of fibrous material, such as glass fiber, and relates more particularly to a winding method of making articles having a greater length than width, such as skiis, which are subjected to all manner of bending and torsional stresses during use.

An important object of the invention is to provide an improved method of orienting continuous glass fiber strands or rovings on a lightweight core which serves to form the three-dimensional pattern for the article and wherein the long glass fiber filaments or rovings are wound around the ends and between the ends at an angle which generally remains constant to the major axis of the long core article so as to give this article, such as a ski, the maximum strength against transverse ruptures or breaks and also resistance against purely torsional forces.

In accordance with the present invention, a relatively long core is wound in the manner hereinafter described with the filaments of glass or other fiber impregnated with a thermosetting resin binder such as epoxy or polyester resin. This resin is rigid after curing. In the case of a ski, the core is flat and has the shape of the finished ski, but has smaller dimensions, since the filament reinforced plastic shell encasing the core has a thickness on the core of a ski of from .030″ or .080″ or even more. In some instances, the core may not be flat but rather have a shaped contour which may be curved or otherwise. The core is mounted for rotation on its major axis in a winding mechanism and arranged to turn at a modest speed and while so turning a continuous filament of glass fiber is applied to the rotating core by the use of a carriage which traverses a distance greater than the entire length of the article in order that the windings extend over the opposed ends of the core as well as helically and circumferentially over all its sides. The carriage is moved back and fourth at a speed of turning such as to rotate at least one, or more than one, revolution during each traverse of the reciprocating carriage. It may also rotate less than one revolution per traverse when the angle is very small. The winding is started and continues until the whole surface of the core is covered with the impregnated glass fibers by a predetermined pattern; the pattern can be designed so as to apply each strand next by the preceding one, or by successive applying strands between the two preceding ones, until the whole core is covered. The carriage supports a reservoir of liquid resin such as epoxy or polyester resins, through which the continuous glass fiber filament passes and the winding proceeds in helical fashion at a constant lead angle which, for example, applies the filament at an angle of not more than 20° and as low as 1° to the axis of rotation. The article may also have girth windings with very small lead, and/or an additional layer or pattern of impregnated fiber glass of any lead angle can be applied on top of the preceding one in order to keep the last one well in place.

In this fashion, none of the glass fiber filaments are parallel with the length of the ski or other long article. The result is a structurally strong member which is especially adapted to bend under longitudinal loads and torsional loads.

Still a different winding may be applied by itself or as an addition to the winding described above. In this case the wound fibers applied on the core are completely parallel to the axis of the ski, which will give the highest possible flexural strength in the longitudinal direction. Here the traversing of the carriage, carrying the liquid plastic, is done while the core remains still. As the carriage traverses along the core, and at the moment, when it passes its end, that is at the moment, when the winding glass fiber looses the contact with the end of the core, the last one makes a turn, and again remains still as the carriage makes its back traversing along the core. This continues each time the carriage passes either end. This rotating of the core as the carriage passes its ends might, for example, be of slightly less or slightly more than a half of a turn; thus after a predetermined and desired amount of traversing the whole core will be covered with the impregnated glass fibers. This parallel winding should be covered by a girth winding to secure the parallel fibers in place.

The core may be made from lightweight material, such as wood, a foamed thermoplastic, foamed thermosets, also from paper or cardboard materials using structures such as honeycomb or a combination of such materials. While the core should be as light in weight as posisble, wood possesses a desired measure of strength and the filament during application can be under a fair tension load without appreciably bending the core. A light weight foamed plastic may also be used for the core; the outer surface of it might then be reinforced in some manner to prevent appreciable bending of the core during winding as a result of the tension on the filaments. This can be accomplished, for instance, by covering some or all sides of the foamed core with gummed paper tape. An inflated hollow core may also be used and the pressure retained during the whole process including the molding of the ski.

The structure may also include girth winding to bind the generally longitudinal filaments together. In most instances the thickness of the fiberglass reinforced layer can be from .030 to .080 inch and if girth winding is included it might be of 2 to 20% of the total thickness. As soon as this has been accomplished, the uncured or green structure is placed in a mold having sides and a cover which provides a cavity of the identical size and contour of the finished molded article desired. In order to provide a tougher surface formation and reinforce the surface against any unwinding action caused by scratching of the surface or catching of the individual filaments, the mold may first be lined with a layer of woven glass cloth, a thin layer of glass mat or surfacing mat covering the bottom and sides of the mold, and finished by a top layer of one of the above mentioned materials over the wound article, before the top plate of the mold is inserted in place. It is obvious to persons experienced in the art of glass fiber reinforced polyesters or epoxy that in order to obtain a smooth finish on the articles, first a gel coat may be applied onto the mold and especially on the sides of the cavity. This can be done by applying on the mold a thixotropic layer of polyester or epoxy by brushing or spraying it, and then to proceed as mentioned before with placing the wound articles in the mold and so on. In most instances, the unwound core is smaller than the finished article and the mold precisely fits the uncured wound article. In other cases, however, the unwound core can be of substantially the same size as the finished wound and cured article but it is compressed to smaller dimensions by the mold. If the finished article is generally straight, the mold will also be straight but in the case of a ski the mold in longitudinal, vertical section will be curved upwardly at one end and will also be curved upwardly at the center to give the ski the desired camber. Heat is applied to the mold and to the cover and pressure to the cover which presses out any air pockets and excess resin and this heat and pressure continues until the resin is cured.

By using the long fibers, rather than chopped ones, oriented by being applied in a predetermined pattern, the multilayers give a higher strength laminate also since this winding method allows for a higher percentage of fiber glass to be used in a given instance than in other methods of applying fiber glass. A further advantage in the method resides in its ready adaptability to partially or fully automated practices.

FIG. 1 is a front elevation of the machine which illustrates the method of the present invention;

FIG. 2 is a plan view of a ski constructed in accordance with the present invention;

FIG. 3 is a section taken on line 3—3 of FIG. 2;

FIG. 4 is a side elevation of the mold used in curing the filament wound article of the present invention;

FIG. 5 is a section taken on line 5—5 of FIG. 4;

FIG. 6 is a sectional view showing an alternative form of core;

FIG. 7 is a transverse section of a ski constructed in accordance with the present invention but with steel runner strips on each edge thereof applied simultaneously during molding;

FIG. 8 shows a similar modification;

FIG. 9 shows a section through a ski constructed in accordance with the present invention with plastic upper and lower surface films applied simultaneously during molding operation;

Figure 10:
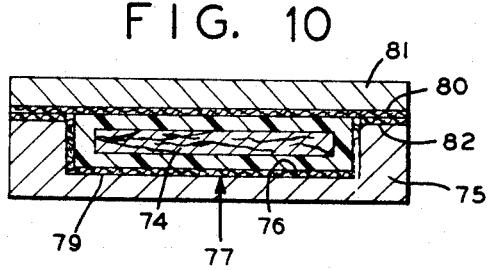
FIG. 10 is a section of a mold having a liner of glass fiber cloth or mat before the wound article is inserted therein.

The unique method of producing the present article may be practiced on various types of winding devices wherein the filaments are applied by a reciprocating traverse carriage. One such machine is shown in FIG. 1 wherein two end frames 10 support aligned chucking members 11 which have fingers which grip the opposed ends of the core 12 which is made from wood or other lightweight material.

Driving rotation is effected by a motor (not shown) and the continuous filament 14 is formed from four strands 16 from separate spools 18. The strands move past a spool 19 and through a number of tension control rollers 20 to a receptacle containing liquid resin which is applied by rollers 22 and a final roller 24 removes the excess resin. The receptacle is mounted on a plate 21. The filaments are spirally wound on the body of the elongated core 12 under modest tension at an angle to the major axis of the rotating core.

The angle of winding is shown as being about 20° to the axis. The carriage comprising the reservoir is supported on two guide rails and reciprocating motion is imparted by a chain 30 driven between two sprockets 31 and when girth windings are formed the carriage is moved slowly by a lead screw 32.

The helical windings are shown at 34 and the girth windings at 36. The winding continues until a suitable thickness of filaments 38 has been achieved. The structure is now placed in a mold 40 having a cavity of the width of the finished ski 42. The contour of the bottom wall of the cavity has the contour of the bottom surface of the finished ski which is upwardly curved at its forward end 44 and to a lesser extent in its central section 45 to give it the proper camber.

The top plate 48 of the mold completes the cavity and is formed with a contour to receive the thickened central section 45 tapering to lesser thickness at each end. This plate is placed in the mold and the same is heated, and pressure applied until the resin is cured. It will be understood that the resin, when cured, has the important function of retaining the wound filaments in their oriented position.

In FIG. 6 an inflatable core 55 is used in the article 56 and the pressure may be retained after the article is formed.

FIG. 7 shows a modification where the molded ski has steel edges. After the core 58 has been wound with plastic impregnated glass fibers 59 it is placed in the mold cavity where steel edge strips 60 with nails 61 have been previously placed.

In FIG. 8, the wooden core 62 has the compacted filament windings, shown at 64, extending over the top, bottom and side, and steel edges 65 secured by nails 66.

A somewhat similar construction is shown in FIG. 9 but the lower wall of the ski has a running surface 71 of polyethylene plastic material and the upper surface has a layer of a different plastic shown at 73.

This construction also includes the wooden core 76, the windings extending over the side 67 and the steel edge 68 secured by nails 69.

In FIG. 10, there is shown a mold 75 having a cavity 76 to receive the wound, uncured article 77 with its core 74 and in this instance, before the latter is placed in the mold, there is first placed therein a strip of glass cloth or mat 79 of sufficient width to cover the bottom and side walls and top edges of the mold and a separate strip 80 may be placed on top of the wound article before the top plate 81 is placed in the mold and the heat and pressure applied as before. After curing, there is a flash 82 along the edge which is readily trimmed.

The molding time can be still further reduced by using preimpregnated glass fiber. Two kinds of plastic coatings can be used.

In one case the glass fiber used for winding the core will be the one that is precoated with a thermosetting plastic and "B-staged" in order to minimize the curing time in the mold, B-staging of thermosetting plastic, coating the fiber glass, is done by letting this plastic coating, made by impregnation of the glass fiber with a catalyzed plastic, to age at room temperature, slightly below or above room temperature. The wound core is then placed in the mold and is being pressed under heat. The wound core is kept under pressure and high temperature in the mold until the plastic is substantially fully cured.

Another type of preimpregnated glass fiber can be used; this one will have a thermoplastic coating. The wound core is placed in the mold as usual. In order to increase the smoothness of the surfaces of this laminate, first a film of the same or similar thermoplastic resin can be placed on the cavity covering the bottom and the sides of the mold, followed by the wound core and finished by a top layer of the same or similar thermoplastic.

Steel edges or plastic surface layers or both can be secured simultaneously during molding operation, the process being made more economical. After placing the steel edges, a strip of a plastic film may be placed over the whole length of the cavity, or the bottom of the cavity may be coated with a plastic coating. This plastic film or the coating will serve as a bottom running surface of the ski. Then, the wound core is placed in the cavity, it is covered with a different kind of plastic layer such as "Formica" or paper base phenolic, the mold cover is put in place and heat and pressure applied.

Figure 11:
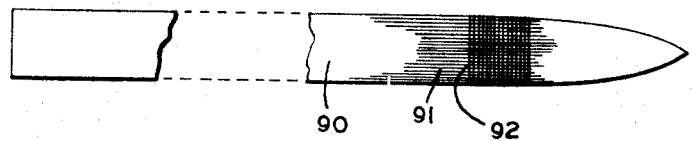
FIG. 11 is a plan view of a ski constructed in accordance with the present invention with girth windings and windings parallel with the major axis of the ski.

In the modification shown in FIG. 11, the ski 90 has windings 91 which extend generally parallel with the opposed edges of the ski and also girth windings 92. The parallel windings extend over the ends of the ski and the machine for effecting said windings will have the usual traverse carriage and the ski will be intermittently rotated 180° as is well known in the art.

Figure 12:
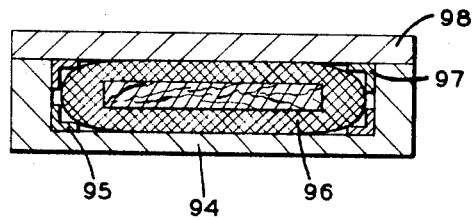
FIG. 12 is a transverse section taken through another core and ski.

In the final form of the invention shown in FIG. 12, the mold 94 with its side walls has a cavity which first receives angular metal edge 95 at the lower corners and the fiber glass winding 96 on a core is placed within the mold, after which the angular metal edges 97 are inserted at the upper corners and the cover 98 placed on the mold.

The embodiments of the invention in which the exclusive property or privilege is claimed are defined as follows:

1. A substantially flat filament wound ski provided with a core of lightweight material having substantially the shape and contour of a conventional ski but of smaller dimension by an amount equal to the desired thickness of the filament winding, said windings comprising a compacted mass of continuous glass fiber filaments extending over the longitudinal surfaces and over the opposed sides and ends of the core, said windings including helical windings and girth windings, said helical windings being disposed at an angle of between 1° and 20° to the major axis of the ski, and a resin binder incorporated in the filament layers, said ski being formed with substantially right angular corners along its longitudinal edges.

2. The structure defined in claim 1 wherein the core is made from wood.

3. The structure defined in claim 1 wherein the core is made from lightweight, non-collapsible and non-compressible material.

4. The structure defined in claim 1 wherein the plastic resin binder between the filaments is a catalyzed and cured thermosetting resin.

5. The structure defined in claim 1 wherein the plastic resin binder between the filaments is catalyzed and cured polyester resin.

6. The structure defined in claim 1 wherein the plastic resin binder between the filaments is a cured epoxy resin having an epoxy curing agent incorporated therein.

7. The structure defined in claim 1 wherein the plastic resin binder between the filaments is a thermoplastic resin.

8. The structure defined in claim 1 wherein the plastic resin binder is a polyolefin.

9. The structure defined in claim 1 wherein the plastic resin binder between the filaments is polyamide.

10. The structure defined in claim 1 with steel edges on both bottom sides of the ski and a plastic running surface film on the bottom of the ski and also a layer of laminated plastic on top of the ski.

11. The structure defined in claim 1 with a plastic running surface film on the bottom of the ski.

12. The structure defined in claim 1 with a layer of laminated plastic on top of the ski.

13. The structure defined in claim 1 with a plastic running surface film on the bottom of the ski and also a layer of laminated plastic on top of the ski.

14. The method of forming a ski from fiber reinforced plastic materials which consists in forming a flat core from lightweight material and then rotating the core on its major axis while winding on the core continuous fiber filaments impregnated with plastic until the core is covered by a plurality of regular patterns with a filament layer in excess of 0.020″ thick, placing the wound core in a mold having a cavity of the shape, contour and curvature of the molded ski including an upwardly curved forward end and upwardly contoured camber, and applying heat and pressure to the ski while in the mold to remove air pockets and any surplus resin.

15. The method as described in claim 14 wherein the filament is impregnated with a liquid catalyzed thermosetting resin during the winding operation.

16. The method as described in claim 14 wherein the fiber filament is impregnated with a liquid mixture of epoxy resin and an epoxy curing agent and B-staged prior to the winding operation.

17. The method as described in claim 14 wherein the fiber filament is impregnated with thermoplastic resin prior to the winding operation.

18. The method as defined in claim 14 wherein said regular patterns of winding is a pattern of helical filament windings extending over the longitudinal surfaces and over to the opposed ends of the core, said helical filament windings being disposed at an angle of between 1° and 20° to the major axis of the ski core.

19. The method as described in claim 14 wherein said regular patterns of winding is a pattern of helical filament windings extending over the longitudinal surfaces and over to the opposed ends of the core, said helical filament windings being disposed at an angle of between 1° and 20° to the major axis of the ski core, and another pattern of helical filament windings of larger angle on top of the first pattern.

20. The method as described in claim 14 wherein said regular patterns of winding is a pattern of helical filament winding extending over the longitudinal surfaces and over to the opposed ends of the core, said helical filament windings being disposed at an angle of between 1° and 20° to the major axis of the ski core and another pattern of girth filament windings on top of the helical one.

21. The method defined in claim 14 wherein steel edge members are first placed in the bottom of the mold and then the wound ski core is placed therein.

22. The method defined in claim 14 wherein a plastic running surface is first placed in the bottom of the mold, after which wound ski core is placed therein.

23. The method defined in claim 14 wherein steel edges are first placed in the bottom of the mold and then a plastic running surface is placed in the bottom of the mold between the steel edges, after which wound ski core is placed therein.

24. The method defined in claim 23 wherein a ski top layer of laminated plastic material is placed on top of the core, after which the mold is closed and the contents cured.

25. The method defined in claim 14 wherein a ski top layer of laminated plastic of greater width than the ski is placed in the mold along with the wound ski core after which the unwanted edges are trimmed to the sides of the ski.

26. The method defined in claim 14 wherein a finished laminated plastic layer forming the upper surface of the ski is placed in the mold before curing and becomes permanently bonded to the wound core.

27. The method defined in claim 26 wherein a plastic running surface layer for the ski is also placed in the mold before curing and the two layers become permanently bonded to the wound core.

28. The method defined in claim 26 wherein steel edges for the running surface of the ski are placed in the mold before curing and become permanently bonded to the wound core.

29. The method of forming a ski from glass fiber reinforced plastic materials which consists in forming a straight wooden core and then rotating this said core on its major axis while winding thereon continuous glass fiber filaments, impregnated with a liquid mixture of epoxy resin with suitable amounts of curing agent, continuing said winding in a generally helical pattern over the longitudinal surfaces and over to the opposed ends of the core wherein the helical filaments have an angle to the major axis of the ski of 1° or more and then applying a pattern of girth windings, placing the wound core in a mold having a cavity of the desired contour, shape and curvature of the finished ski and then applying heat and pressure to the wound core in the mold to remove surplus resin, air pockets and to bend the wound core that it can assume all the configurations of the finished ski.

References Cited

UNITED STATES PATENTS

| | | | |
|---|---|---|---|
| 2,858,992 | 11/1958 | Wentz | 156—172 |
| 3,199,882 | 8/1965 | Peillex | 280—11.13 |

FOREIGN PATENTS

| | | |
|---|---|---|
| 223,088 | 8/1962 | Austria. |
| 572,337 | 3/1959 | Canada. |
| 985,174 | 3/1951 | France. |
| 1,273,422 | 9/1961 | France. |
| 1,351,207 | 12/1963 | France. |
| 804,861 | 11/1958 | Great Britain. |
| 95,817 | 3/1960 | Norway. |
| 312,244 | 2/1956 | Switzerland. |

BENJAMIN HERSH, *Primary Examiner.*

M. L. SMITH, *Assistant Examiner.*